United States Patent
Bongaarts et al.

(10) Patent No.: US 11,917,478 B2
(45) Date of Patent: Feb. 27, 2024

(54) DYNAMIC CELLULAR NETWORK SELECTION FOR EDGE-COMPUTING OF AN APPLICATION

(71) Applicant: T-Mobile USA, Inc., Bellevue, WA (US)

(72) Inventors: Paul Bongaarts, Issaquah, WA (US); Andrew Gapin, Seattle, WA (US); Gunjan Nimbavikar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 55 days.

(21) Appl. No.: 16/944,815

(22) Filed: Jul. 31, 2020

(65) Prior Publication Data
US 2022/0038979 A1 Feb. 3, 2022

(51) Int. Cl.
| | | |
|---|---|---|
| H04W 36/14 | (2009.01) | |
| H04W 8/18 | (2009.01) | |
| H04W 36/32 | (2009.01) | |
| H04W 36/30 | (2009.01) | |
| H04W 48/16 | (2009.01) | |
| H04W 88/06 | (2009.01) | |

(52) U.S. Cl.
CPC ........... *H04W 36/14* (2013.01); *H04W 8/183* (2013.01); *H04W 36/30* (2013.01); *H04W 36/32* (2013.01); *H04W 48/16* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2010/0099405 A1* | 4/2010 | Brisebois | H04L 41/0893 455/434 |
| 2012/0309391 A1* | 12/2012 | Zhang | H04W 48/16 455/432.1 |
| 2019/0069224 A1* | 2/2019 | Lee | H04L 65/1073 |
| 2019/0373443 A1* | 12/2019 | Palaniappan | H04W 60/00 |
| 2020/0008044 A1* | 1/2020 | Poornachandran | G01C 21/3461 |
| 2020/0196203 A1* | 6/2020 | Yang | H04W 36/10 |
| 2020/0275313 A1* | 8/2020 | He | H04W 28/0983 |

(Continued)

*Primary Examiner* — German Viana Di Prisco
(74) *Attorney, Agent, or Firm* — Lee & Hayes, P.C.

(57) ABSTRACT

An apparatus, method, and system disclosed herein are directed to a user equipment (UE) capable of dynamically selecting a telecommunication network for running an application using edge-computing capability of the telecommunication network. A subscriber identity module (SIM), such as an eSIM, may be provisioned for a plurality of preferred telecommunication networks of a multi-network mobile edge computing (MEC) system where each network of the plurality of preferred telecommunication networks meets an edge-computing requirement of the application. A workload associated with the application may be distributed among edge-computing nodes of a first network of the plurality of preferred telecommunication networks. Upon detecting a degradation in a service associated with running the application on the first network, running of the application may be switched to a second network of the plurality of preferred telecommunication networks and the workload may be distributed among edge-computing nodes of the second network.

20 Claims, 5 Drawing Sheets

(56) References Cited

U.S. PATENT DOCUMENTS

| | | | |
|---|---|---|---|
| 2021/0195686 A1* | 6/2021 | Kaur | H04W 36/00 |
| 2021/0235355 A1* | 7/2021 | Seo | H04W 36/14 |
| 2021/0243264 A1* | 8/2021 | Yoon | H04L 67/22 |
| 2021/0258374 A1* | 8/2021 | Wang | H04L 67/14 |
| 2021/0400568 A1* | 12/2021 | Chaysinh | H04W 36/22 |

* cited by examiner

DYNAMIC CELLULAR NETWORK SELECTION FOR EDGE-COMPUTING OF AN APPLICATION

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UNITS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed. The 5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

However, sending data from a user equipment (UE), such as a mobile phone, to a data center or to the cloud through a network or networks, may still create bandwidth and latency issues. Edge-computing is a distributed computing system and method that keeps computing and data storage close to a user, i.e., the UE of the user on which an application is running and provides improvements to application performance and efficiency in areas such as latency and bandwidth. Multi-access, or Mobile, Edge Computing (MEC) system aims to offer low latency, high bandwidth, and real-time access to radio network information of a mobile network operator (MNO). A UE, such as a mobile phone, may move while an application is running on an MEC system of the MNO and may experience degradation in service due to a change in a geographical location which may have a different network coverage.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
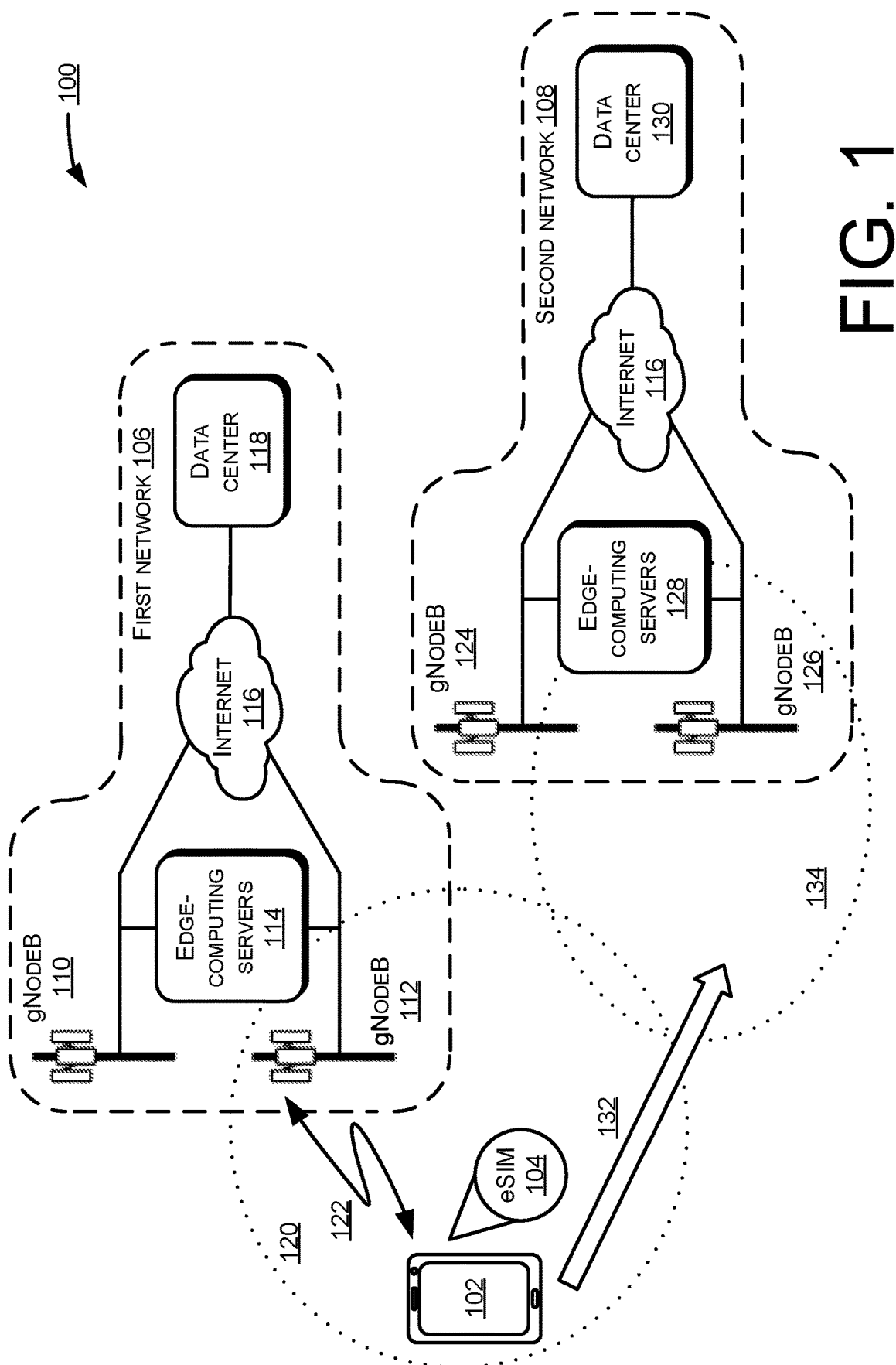
FIG. 1 illustrates an example environment in which a user equipment (UE) may run an application using edge-computing of a first telecommunication network and switch to run the application using edge-computing of a second telecommunication network.

An apparatus, method, and system disclosed herein are directed to a user equipment (UE) capable of dynamically selecting a telecommunication network for running an application using edge-computing capability of the telecommunication network.

A UE, such as a cellular or mobile phone, may be provisioned, via a subscriber identity module (SIM) of the UE, to operate with a certain primary mobile network operator (MNO) or telecommunication network provider based on a contract associated with the UE and the MNO. With a dual SIM technology, electronic SIM (eSIM), or a traditional SIM combined with the eSIM, a UE may be provisioned to work with more than one MNOs as primary carriers. For example, a user of a UE having an eSIM may provision the eSIM such that a first phone number, a personal phone number for example, is associated with a first carrier, and a second phone number, a business phone number for example, is associated with a second carrier. This way, the user is able to separate personal calls from business calls without having to carry two different phones.

A user of an eSIM-equipped UE, having a telecommunication networks A and B provisioned, may also select a telecommunication network based on an application to be run on the UE. For example, if the user plans to run a video application requiring high data and bandwidth usage, he may select to run the video application on the telecommunication network A based on more favorable data plan, such as no throttling, over the telecommunication network B, which may slow data traffic after 15 GB for example. For another example, the user may select the telecommunication network B for talk and text over the telecommunication network A if the telecommunication network B plan included unlimited talk and text. Therefore, based on the service agreements, such as a service level agreement (SLA), with the provisioned telecommunication network, the user may select to run an application on a particular provisioned network, instead of the other provisioned network, that may be more suited for the requirements of the application.

As the UE moves and changes its location, the coverage by the originally selected telecommunication network may diminish, and the UE may need to be handed over to a different telecommunication network while running the application that was initially running on the originally selected telecommunication network. While some applications may tolerate the handover well and the user may not even notice the handover or performance difference in the applications, other applications may be more sensitive to how processing and data are handled by the different telecommunication network. For example, an application, that requires low latency, may be designed to take advantage of edge-computing, or processing, which provides improvements to application performance and efficiency in areas such as latency and bandwidth by processing and storing data associated with the application locally by the edge-computing of the network. Such an application, currently running on the edge-computing of the originally selected telecommunication network, may experience unacceptable performance degradation if it is switched to run on the different telecommunication network having no edge-computing capability due to higher latency associated with non-edge-computing, which may process and store data at a central data center located remotely from the UE.

To manage the handover, thus by avoiding an undesired handover to a non-edge computing network, the SIM, such as an eSIM or a dual SIM, of the UE may be provisioned for a plurality of preferred telecommunication networks of a multi-network mobile edge computing (MEC) system with each network of the plurality of preferred telecommunication networks meeting an edge-computing requirement of an application, such as a maximum latency of 10 msec and a jitter requirement (variation in latency) of 5 msec. The user of the UE may initiate running of the application on a first network of the plurality of preferred telecommunication networks, which may distribute a workload of the application, such as processing and storing of data associated with the application, among edge-computing nodes of the first network. Upon detecting a degradation in a service associated with running the application on the first network, such as Signal-to-Interference-plus-Noise Ratio (SINR), Reference Signals Received Power (RSRP), Channel Quality Indicator, (CQI), and the like, falling below a corresponding threshold, the UE may be handed over to a second network of the plurality of preferred telecommunication networks provisioned in the eSIM. Because the second network meets the edge-computing requirement of the application, the application may be able to run on the edge-computing of the second network without experiencing any performance issue.

FIG. 1 illustrates an example environment 100 in which a user equipment (UE) may operate in a network and run an application using edge-computing of the network.

A UE 102, such as a cellular phone, may be equipped with a subscriber identity module (SIM), such as a dual SIM or an electronic SIM (eSIM) 104. The eSIM 104 may be provisioned for a plurality of preferred telecommunication networks of a multi-network mobile edge computing (MEC) system, including a first network 106 and a second network 108. Each network of the plurality of preferred telecommunication networks, such as the first network and the second network 108 may be known to meet an edge-computing requirement of an application loaded on the UE 102. The first network 106 may comprise a plurality of base stations, such gNodeBs (two gNodeBs 110 and 112 are shown in this example), and one or more edge-computing servers (edge-computing servers) 114 communicatively coupled to the gNodeBs 110 and 112. The gNodeBs 110 and 112 may also be communicatively coupled to the internet 116, which may connect to other networks and services including a data center 118 of the first network 106. The UE 102 is shown to be within a coverage area of the first network 106, i.e., within a coverage area 120 of the gNodeB 112, and in communication with the gNodeB 112 as indicated by an arrow 122.

The second network 108 may similarly comprise a plurality of base stations, such gNodeBs (two gNodeBs 124 and 126 are shown in this example), and one or more edge-computing servers (edge-computing servers) 128 communicatively coupled to the gNodeBs 124 and 126. The gNodeBs 124 and 126 may also be communicatively coupled to the internet 116, which may connect to other networks and services including a data center 130 of the second network 108. The UE 102 is shown to be moving (arrow 132) towards the second network 108, however, the UE 102 is not yet within a coverage area 134 of the eNodeB 126 of the second network 108.

The UE 102 may detect, or receive, an indication to activate, or initiate, the application. The UE 102, determining that the application is to run on edge-computing of a telecommunication network, may search for one or more of the plurality of preferred telecommunication networks provisioned in the eSIM 104. If the UE 102 finds more than one preferred telecommunication networks, the UE 102 may determine a priority level of each of the preferred networks and select a network based at least in part on a priority level of the network, in this example, the first network 106. The priority level may be based on a service level agreement (SLA) including a guaranteed maximum latency and/or an acceptable range of jitter. The UE 102 may then run the application on the first network 106, in this example, via the gNodeB 112, and have a workload associated with an application distributed among edge-computing nodes, such as the edge-computing servers 114, of the first network 106. As the UE 102 moves away from the coverage area 120 of the gNodeB 112, a service associated with running the application on the first network 106 via the gNodeB 112 may degrade, which may be determined, or recognized, by degradation in link performance parameters, such as the Signal-to-Interference-plus-Noise Ratio (SINR), Reference Signals Received Power (RSRP), Channel Quality Indicator, (CQI), and the like, between the UE 102 and the gNodeB 112. If at least one of the link performance parameters continues to degrade, or falls below a threshold level, the UE 102 may benefit from switching to another telecommunication network capable of running the application on its edge-computing nodes.

The UE 102 may then scan for another network of the plurality of preferred telecommunication networks provisioned in the eSIM 104 which has a better link condition, or performance, than the current link condition with the gNodeB 112. If the UE 102 finds more than one preferred telecommunication network, the UE 102 may determine a priority level of each of the preferred telecommunication networks and select a network based at least in part on a priority level of the network, in this example, the second network 108. The UE 102, now in the coverage area 134 of the gNodeB 126, may switch to run the application on the edge-computing serves 128 of the second network 108. Switching from the first network 106 to the second network 108 may be accomplished dynamically by utilizing a dual SIM dual standby (DSDS) mode or a dual SIM dual Active (DSDA) mode.

Figure 2:
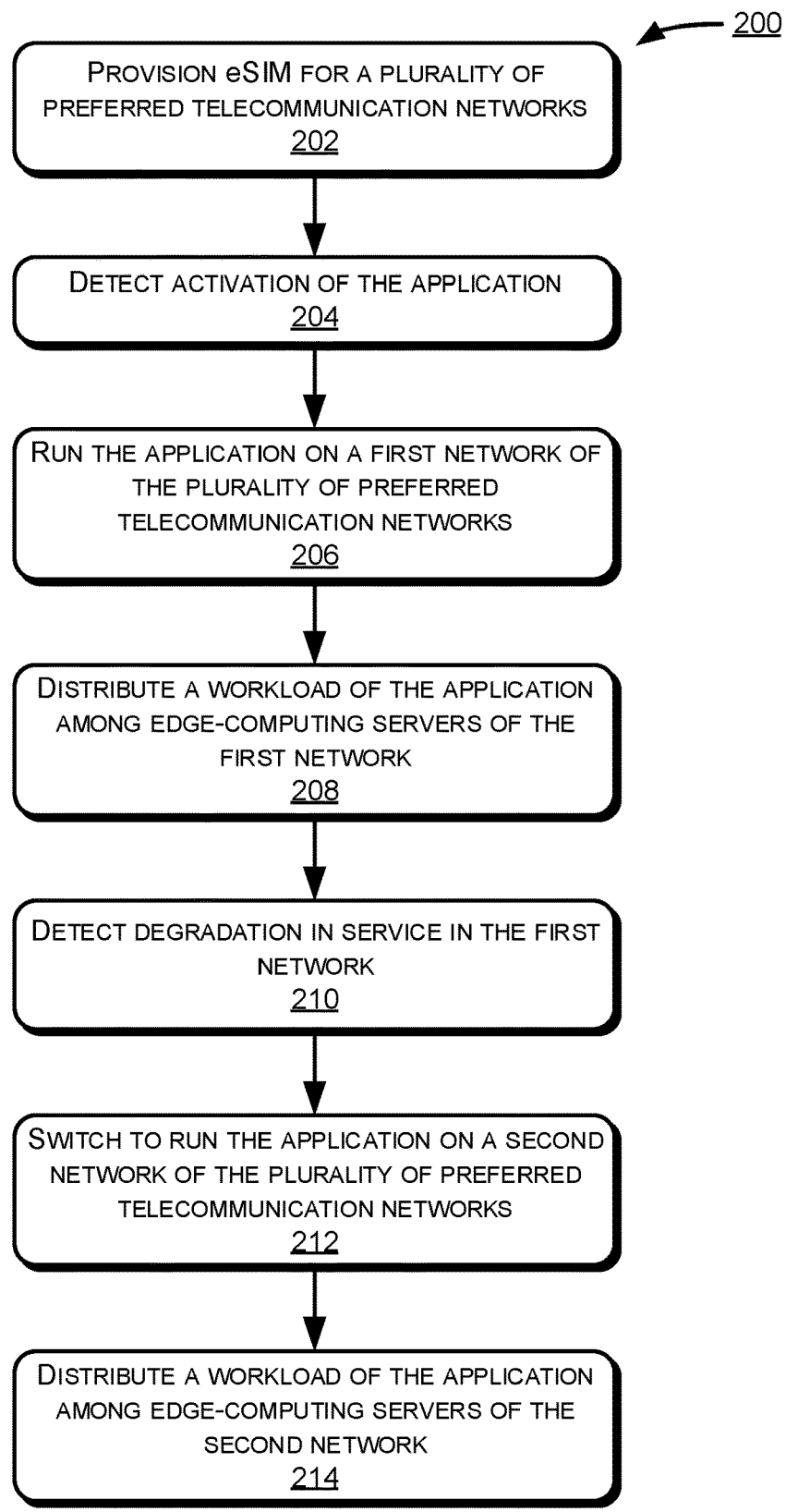
FIG. 2 illustrates an example process for running an application using edge-computing of the first telecommunication network and switching to run the application using edge-computing of the second telecommunication network.

FIG. 2 illustrates an example process 200 for running an application using edge-computing of the first network and switching to run the application using edge-computing of the second network.

At block 202, a subscriber identity module (SIM) of a UE, such as the eSIM 104 of the UE 102, may be provisioned for a plurality of preferred telecommunication networks of a multi-network mobile edge computing (MEC) system as described above with reference to FIG. 1. The SIM may alternatively be a dual SIM. Each network of the plurality of preferred telecommunication networks may be selected based on meeting an edge-computing requirement of an application loaded on the UE 102, such as a network performance guaranteed in a service level agreement (SLA) of the corresponding network associated with the UE 102, such as a maximum latency and/or an acceptable range of jitter.

At block 204, the UE 102 may detect, or receive, an indication to activate, or initiate, the application, and run the application on a first network, such as the first network 106, of the plurality of preferred telecommunication networks at block 206. Within the first network 106, a workload associated with the application may be distributed among edge-computing nodes, such as the edge-computing servers 114 of the first network 106 at block 208. The application may cause the first network 106 to distribute the workload among the edge-computing servers 114 in a predetermined way or have the first network 106 distribute the workload among the edge-computing servers 114 to optimize the performance such as minimizing latency and data traffic or maintaining a constant latency. Upon detecting a degradation in a service associated with running the application on the first network 106 at block 210, the UE 102 may switch to run the application on a second network of the plurality of preferred telecommunication networks, such as the second network 108 at block 212. The UE 102 may dynamically switch from the first network 106 to the second network 108 by utilizing a dual SIM dual standby (DSDS) mode or a dual SIM dual Active (DSDA) mode. At block 214, a workload associated with the application may be distributed among edge-computing nodes, such as the edge-computing servers 128 of the second network. The application may cause the second network 108 to distribute the workload among the edge-computing servers 128 in a predetermined way or have the second network 108 distribute the workload among the edge-computing servers 128 to optimize the performance such as minimizing latency and data traffic or maintaining a constant latency.

Figure 3:
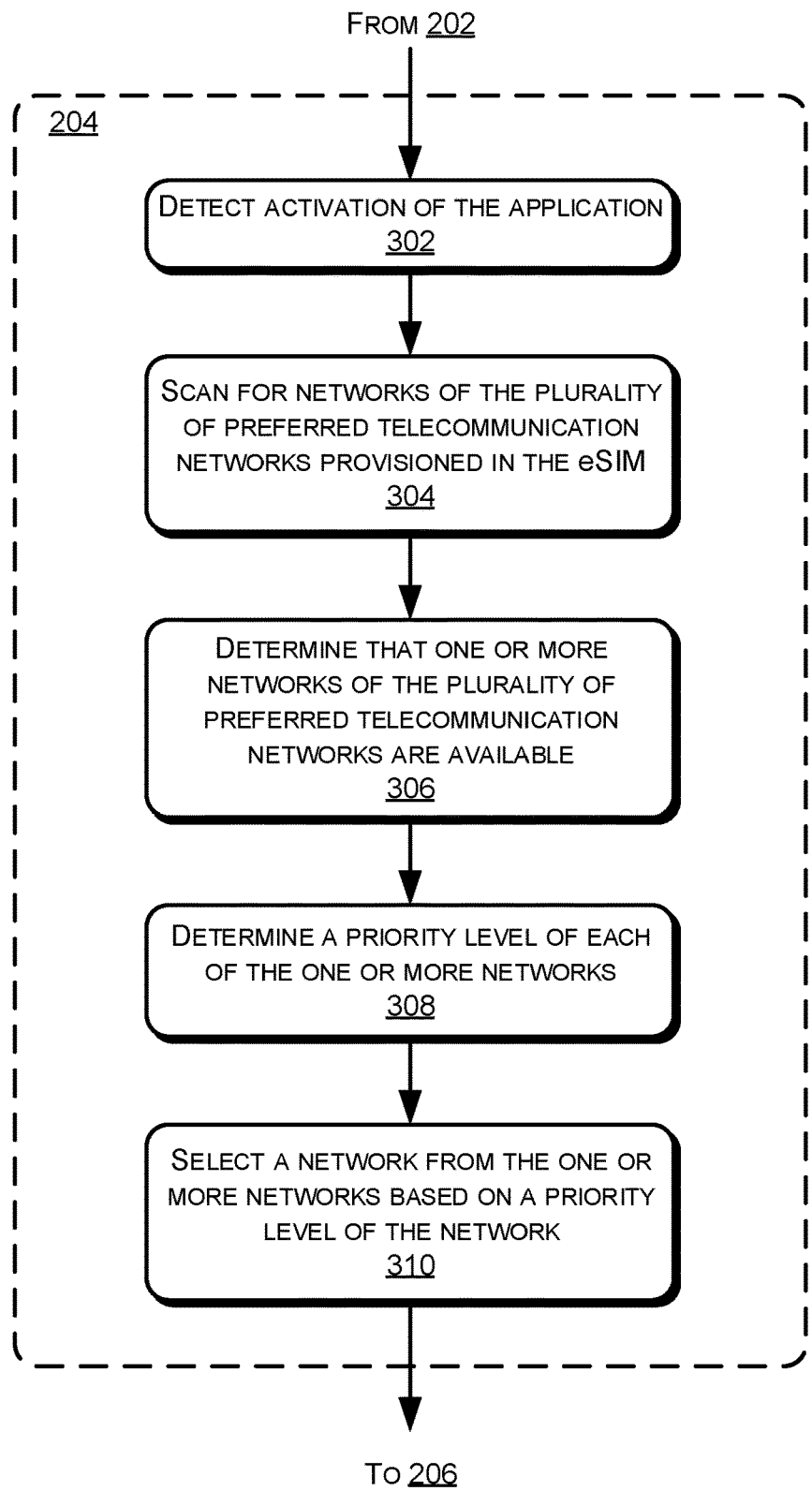
FIG. 3 illustrates an example process of one of the blocks of FIG. 2.

FIG. 3 illustrates an example process block 204 of FIG. 2.

At block 302, the UE 102 may detect, or receive, an indication to activate, or initiate, the application, and the UE 102 may scan, based at least in part on the indication, for networks of the plurality of preferred telecommunication networks provisioned in the eSIM 104 at block 304. At block 306, the UE 102 may determine that one or more networks of the plurality of preferred telecommunication networks are available based on a result of the scanning where the one or more networks include the first network 106 and may determine a priority level of each of the one or more networks at block 308. The priority level may be based at least in part on an SLA of the respective network associated with the UE 102. For example, a network having an SLA that guarantees a minimum latency of 10 msec may have a higher priority over another network having an SLA that guarantees a minimum latency of 20 msec. The UE 102 may select a network, such as the first network 106, from the one or more networks based at least in part on the priority level of the first network 106. Then the process proceeds to block 206.

Figure 4:
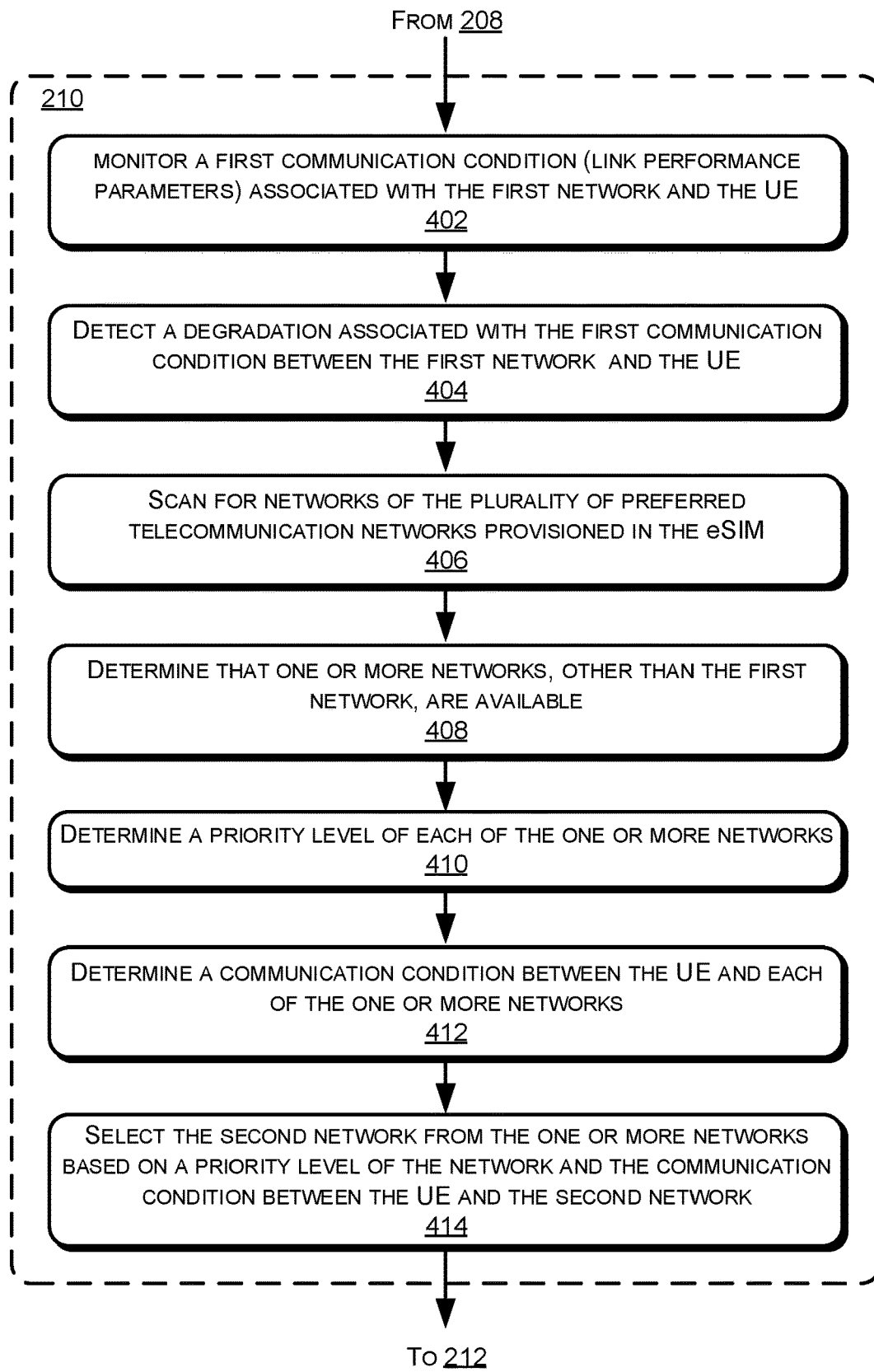
FIG. 4 illustrates an example process of another blocks of FIG. 2.

FIG. 4 illustrates an example process of block 210 of FIG. 2.

At block 402, the UE 102 may continue monitoring a first communication condition based on link performance parameters associated with the first network 106. The link performance parameters may include Signal-to-Interference-plus-Noise Ratio (SINR), Reference Signals Received Power (RSRP), Channel Quality Indicator, (CQI), and the like, and the UE 102 may detect a degradation associated with the first communication condition between the first network 106 and the UE 102 at block 404. For example, the UE 102 may determine that one or more of the link performance parameters have fallen below corresponding thresholds. At block 406, the UE 102 may scan for networks, other than the first network 106, of the plurality of preferred telecommunication networks provisioned in the eSIM 104, and may determine that one or more networks of the plurality of preferred telecommunication networks, other than the first network 106, are available based on a result of the scanning at block 408 where the one or more networks include the second network 108. At block 410, a priority level of each of the one or more networks may be determined based on an SLA of a corresponding network with the UE 102. For example, a network having an SLA that guarantees a minimum latency of 10 msec may have a higher priority over another network having an SLA that guarantees a minimum latency of 20 msec.

At block 412, a communication condition between the UE 102 and each of the one or more networks other than the first network 106 may be determined. For example, if the SINR between the UE 102 and a particular network of the one or more networks is worse than the SINR between the UE 102 and the first network 106, then it may not be beneficial for the UE 102 to switch from first network 106 to the particular network. However, if the SINR between the UE 102 and the particular network, such as the second network 108, is better than the SINR between the UE 102 and the first network 106, then it may be beneficial for the UE 102 to switch from first network 106 to the second network 108. At block 414, the second network 108 may be selected based at least in part on the priority of the second network 108 and the communication condition between the UE 102 and the second network 108.

Additionally, or alternatively, the UE 102 may determine its current location, for example, using the Global Positioning System (GPS), and receive a list of locally available networks of the plurality of preferred telecommunication networks via a local telecommunication network, such as a cellular or WiFi network with which the UE 102 is currently in communication. When the UE 102 receives an indication to activate the application or determines to switch the network, the UE 102 may scan for available networks of the plurality of preferred telecommunication networks based on the list, which may also include a priority level and SLA related information of each network on the list.

Figure 5:
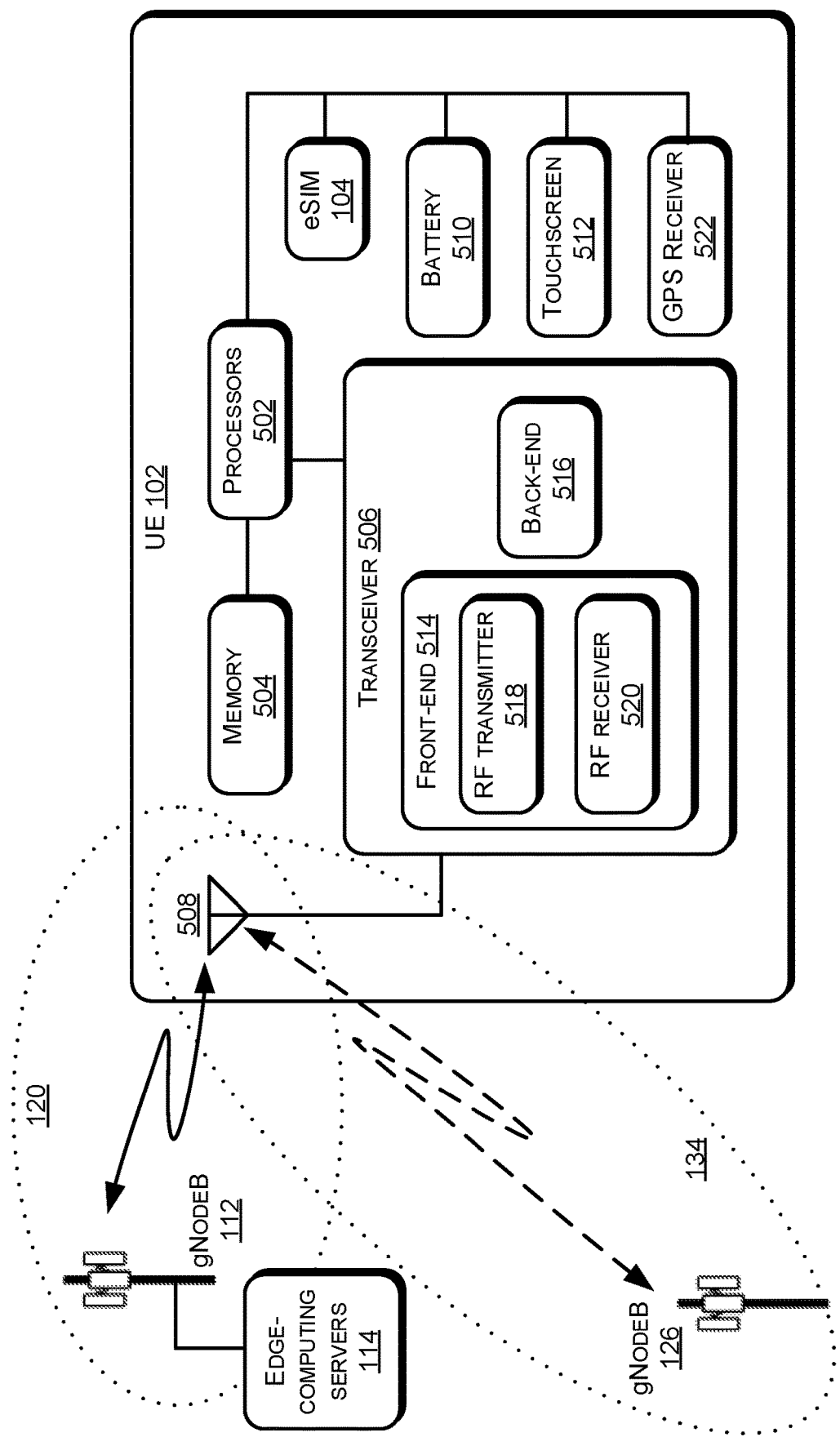
FIG. 5 illustrates an example system block diagram of the UE.

FIG. 5 illustrates an example system block diagram of the UE 102.

As described above with reference to FIGS. 1-4, the UE 102 may operate in the first network 106 or the second network 108 of the plurality of preferred telecommunication networks, and may comprise one or more processors (processors) 502 communicatively coupled to memory 504, a SIM, such as the eSIM 104, a transceiver 506 having one or more antennas (antennas) 508, battery 510, an input/output (I/O) interface, such as a touchscreen 512, a microphone (not shown), and a speaker (not shown). The transceiver 506 may be categorized into two sections, a front-end 514 and a back-end 516. The front-end 514 may generally comprise radio frequency (RF) circuits, such as an RF transmitter 518, an RF receiver 520, a local oscillator (not shown), a mixer (not shown), and filters (not shown). The front-end 514 may down-convert received RF signals such that the back-end 516 may process the down-converted received RF signals, such as extracting data. The front-end 514 may also up-convert data from the back-end 516 to RF signals to be transmitted through the transmitter 518. The back-end 516 may also provide link performance parameters, such as Signal-to-Interference-plus-Noise Ratio (SINR), Reference Signals Received Power (RSRP), Channel Quality Indicator, (CQI), and the like.

In some embodiments, the processors 502 may be a central processing unit (CPU), a graphics processing unit (GPU), or both CPU and GPU, or other processing unit or component known in the art. The memory 504 may include volatile memory (such as random access memory (RAM)) and/or non-volatile memory (such as read-only memory (ROM), flash memory, etc.). The memory 504 may also include additional removable storage and/or non-removable storage including, but not limited to, flash memory, magnetic storage, optical storage, and/or tape storage that may provide non-volatile storage of computer-readable instructions, data structures, program modules, and other data for the UE 102. The memory 504 may store computer-readable instructions that, when executed by the processors 502, may cause the processors 502 to perform operations described below.

The processors 502 may provision the eSIM 104 for a plurality of preferred telecommunication networks of a multi-network mobile edge computing (MEC) system as described above with reference to FIG. 1. The SIM of the UE 102 may alternatively be a dual SIM. The processors 502 may select each network of the plurality of preferred telecommunication networks based on meeting an edge-computing requirement of an application loaded on the UE 102, such as a network performance guaranteed in a service level agreement (SLA) of the corresponding network associated with the UE 102, such as a maximum latency and additionally on inputs from a user of the UE 102 via the touchscreen 512.

The processors 502 may detect, or receive, an indication to activate, or initiate, the application, via the touchscreen 512, and in response, may scan, by the transceiver 506, for networks of the plurality of preferred telecommunication networks provisioned in the eSIM 104. Upon determining that one or more networks of the plurality of preferred telecommunication networks are available based on a result of the scanning, the processors 502 may determine a priority level of each of the one or more networks. The priority level may be based at least in part on an SLA of the respective network associated with the UE 102. For example, a network having an SLA that guarantees a minimum latency of 10 msec may have a higher priority over another network having an SLA that guarantees a minimum latency of 20 msec. The processors 502 may select a network, such as the first network 106, from the one or more networks based at least in part on the priority level of the first network 106 and run the application on the first network 106 via the gNodeB 112.

In this example, the UE 102 is shown to be in communication with the gNodeB 112 within the coverage area 120 of the first network 106. Within the first network 106, the processors 502 may, via instructions sent from the transceiver 506 to the gNodeB 112, cause a workload associated with the application to be distributed among e the edge-computing servers 114 of the first network 106 in a predetermined way or have the first network 106 distribute the workload among the edge-computing servers 114 to optimize the performance such as minimizing latency and data traffic.

The processors 502, by the transceiver 506, may continue monitoring a first communication condition based on link performance parameters associated with the first network 106 and the UE 102. The link performance parameters may include Signal-to-Interference-plus-Noise Ratio (SINR), Reference Signals Received Power (RSRP), Channel Quality Indicator, (CQI), and the like. For example, the processors 502 may determine that one or more of the link performance parameters have fallen below corresponding thresholds. In response, the processors 502, by the transceiver 506, may scan for networks, other than the first network 106, of the plurality of preferred telecommunication networks provisioned in the eSIM 104. Upon determining that one or more networks of the plurality of preferred telecommunication networks, other than the first network 106, are available based on a result of the scanning, the processors 502 may determine a priority level of each of the one or more networks may be determined based on an SLA of a corresponding network with the UE 102. For example, a network having an SLA that guarantees a minimum latency of 10 msec may have a higher priority over another network having an SLA that guarantees a minimum latency of 20 msec.

Before determining to switch from the first network 106 to one of the one or more networks, the processors 502 may evaluate a communication condition between the UE 102 and each of the one or more networks other than the first network 106. For example, if the SINR between the UE 102 and a particular network of the one or more networks is worse than the SINR between the UE 102 and the first network 106, then it may not be beneficial for the UE 102 to switch from first network 106 to the particular network. However, if the SINR between the UE 102 and the particular network, such as the second network 108, is better than the SINR between the UE 102 and the first network 106, then it may be beneficial for the UE 102 to switch from first network 106 to the second network 108. The processors 502 may then select a specific network, such as the second network 108, of the one or more networks based at least in part on the priority of the second network 108 and the communication condition between the UE 102 and the second network 108. The processors 502 may switch to run the application on the second network and distribute the workload among the edge-computing servers 128 of the second network 108 similarly to the work distribution of the application with the edge-computing servers 114 as described above. The processors 502 may cause the UE 102 to dynamically switch from the first network 106 to the second network 108 by utilizing a dual SIM dual standby (DSDS) mode or a dual SIM dual Active (DSDA) mode.

The UE 102 may further comprise a Global Positioning System (GPS) receiver 522 communicatively coupled to the processors 502. The processors 502 may, additionally, or alternatively, determine its current location using the GPS receiver and receive a list of locally available networks of the plurality of preferred telecommunication networks via a local telecommunication network, such as a cellular or WiFi network with which the UE 102 is currently in communication. When the processors 502 detects an indication to activate the application or determines to switch the network, the processors 504 may scan, by the transceiver 506, for available networks of the plurality of preferred telecommunication networks based on the list, which may also include a priority level and SLA related information of each network on the list.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media include at least two types of computer-readable media, namely computer-readable storage media and communications media. Computer-readable storage media include volatile and non-volatile, removable and non-removable media implemented in any process or technology for storage of information such as computer-readable instructions, data structures, program modules, or other data. Computer-readable storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A method in a user equipment (UE) comprising: provisioning a subscriber identity module (SIM) for a plurality of preferred telecommunication networks of a multi-network mobile edge computing (MEC) system, a network of the plurality of preferred telecommunication networks meeting an edge-computing requirement of an application loaded on the UE; running the application on a first network of the plurality of preferred telecommunication networks; having a workload associated with the application distributed among edge-computing nodes of the first network; and upon detecting a degradation in a service associated with running the application on the first network, running the application on a second network of the plurality of preferred telecommunication networks.

B. The method as paragraph A recites, wherein the SIM includes an eSIM or a dual SIM.

C. The method as paragraph A recites, wherein running the application on the second network of the plurality of preferred telecommunication networks includes: dynamically switching from the first network to the second network based on a dual SIM dual standby (DSDS) mode or a dual SIM dual Active (DSDA) mode.

D. The method as paragraph A recites, wherein having the workload of the application distributed among the edge-computing nodes of the first network includes: causing the first network to distribute the workload of the application among the edge-computing nodes of the first network.

E. The method as paragraph A recites, further comprising: having the workload of the application distributed among edge-computing nodes of the second network.

F. The method as paragraph E recites, wherein having the workload of the application distributed among the edge-computing nodes of the second network includes: causing the second network to distribute the workload of the application among the edge-computing nodes of the second network.

G. The method as paragraph A recites, wherein the network of the plurality of preferred telecommunication networks meeting the requirement of the application is based on a service level agreement (SLA) of the network associated with the UE.

H. The method as paragraph G recites, prior to running the application on the first network, further comprising: receiving an indication to activate the application; scanning, based at least in part on the indication, for networks of the plurality of preferred telecommunication networks provisioned in the SIM; determining that one or more networks of the plurality of preferred telecommunication networks provisioned in the SIM are available based on a result of the scanning, the one or more networks including the first network; determining a priority level of each of the one or more networks; and selecting the first network based at least in part on a priority level of the first network.

I. The method as paragraph H recites, wherein the priority level of each of the one or more networks is based at least in part on a respective SLA of the one or more networks associated with the UE.

J. The method as paragraph I recites, wherein the SLA includes at least one of a guaranteed maximum latency or an acceptable range of jitter.

K. The method as paragraph G recites, wherein detecting the degradation in the service associated with running the application on the first network includes: detecting a degradation associated with a first communication condition between the first network and the UE; scanning for networks, other than the first network, of the plurality of preferred telecommunication networks provisioned in the SIM; determining that one or more networks of the plurality of preferred telecommunication networks, other than the first network, are available based on a result of the scanning, the one or more networks including the second network; determining a priority level of each of the one or more networks based on an SLA of a corresponding network with the UE; determining a communication condition between the UE and each of the one or more networks; and selecting the second network based at least in part on the priority of the second network and the communication condition between the UE and the second network.

L. The method as paragraph K recites, further comprising: determining a location of the UE, wherein scanning for the another network of the plurality of preferred telecommunication networks includes: receiving a list of available networks of the plurality of preferred telecommunication networks based on the location; and scanning for the available networks of the plurality of preferred telecommunication networks.

M. A system for a user equipment (UE) comprising: one or more processors; a subscriber identity module (SIM) communicatively coupled to the one or more processors; and memory communicatively coupled to the one or more processors, the memory storing computer-readable instructions that, when executed by the one or more processors, cause the one or more processors to perform operations comprising: provisioning the SIM for a plurality of preferred telecommunication networks of a multi-network mobile edge computing (MEC) system, a network of the plurality of preferred telecommunication networks meeting an edge-computing requirement of an application loaded on the UE, running the application on a first network of the plurality of preferred telecommunication networks, having a workload associated with the application distributed among edge-computing nodes of the first network, upon detecting a degradation in a service associated with running the application on the first network, running the application on a second network of the plurality of preferred telecommunication networks, and having the workload of the application distributed among edge-computing nodes of the second network.

N. The system as paragraph M recites, wherein the SIM includes an eSIM or a dual SIM, and wherein running the application on the second network of the plurality of preferred telecommunication networks includes: dynamically switching from the first network to the second network based on a dual SIM dual standby (DSDS) mode or a dual SIM dual Active (DSDA) mode.

O. The system as paragraph M recites, wherein the network of the plurality of preferred telecommunication networks meeting the requirement of the application is based on a service level agreement (SLA) of the network associated with the UE.

P. The system as paragraph O recites, wherein the operations further comprise, prior to running the application on the first network: receiving an indication to activate the application; scanning, based at least in part on the indication, for networks of the plurality of preferred telecommunication networks provisioned in the SIM; determining that one or more networks of the plurality of preferred telecommunication networks provisioned in the SIM are available based on a result of the scanning, the one or more networks including the first network; determining a priority level of each of the one or more networks; and selecting the first network based at least in part on a priority level of the first network.

Q. The system as paragraph O recites, wherein detecting the degradation in the service associated with running the application on the first network includes: detecting a degradation associated with a first communication condition between the first network and the UE; scanning for another network of the plurality of preferred telecommunication networks; determining that one or more networks of the plurality of preferred telecommunication networks are available based on a result of the scanning, the one or more networks including the second network; determining a priority of each of the one or more networks based on an SLA of a corresponding network with the UE; determining a communication condition between the UE and each of the one or more networks; and selecting the second network based at least in part on the priority of the second network and the communication condition between the UE and the second network.

R. One or more non-transitory computer-readable storage media storing computer-readable instructions that, when executed by one or more processors of a user equipment (UE), cause the one or more processors to perform operations comprising: provisioning a subscriber identity module (SIM) of the UE for a plurality of preferred telecommunication networks of a multi-network mobile edge computing (MEC) system, a network of the plurality of preferred telecommunication networks meeting an edge-computing requirement of an application loaded on the UE; running the application on a first network of the plurality of preferred telecommunication networks; having a workload of the application distributed among edge-computing nodes of the first network; upon detecting a degradation in a service associated with running the application on the first network, dynamically switching from the first network to a second network of the plurality of preferred telecommunication networks based on a dual SIM dual standby (DSDS) mode or a dual SIM dual Active (DSDA) mode; running the application on the second network; and having the workload associated with the application distributed among edge-computing nodes of the second network.

S. The one or more non-transitory computer-readable storage media as paragraph R recites, wherein the operations further comprise, prior to running the application on the first network: receiving an indication to activate the application; scanning, based at least in part on the indication, for networks of the plurality of preferred networks provisioned in the SIM; determining that one or more networks of the plurality of preferred networks provisioned in the SIM are available based on a result of the scanning, the one or more networks including the first network; determining a priority level of each of the one or more networks; and selecting the first network based at least in part on a priority level of the first network.

T. The one or more non-transitory computer-readable storage media as paragraph R recites, wherein the network of the plurality of preferred telecommunication networks meeting the requirement of the application is based on a service level agreement (SLA) of the network associated with the UE, and wherein detecting the degradation in the service associated with running the application on the first network includes: detecting a degradation associated with a first communication condition between the first network and the UE; scanning for another network of the plurality of preferred telecommunication networks; determining that one or more networks of the plurality of preferred telecommunication networks are available based on a result of the scanning, the one or more networks including the second network; determining a priority of each of the one or more networks based on an SLA of a corresponding network with the UE; determining a communication condition between the UE and each of the one or more networks; and selecting the second network based at least in part on the priority of the second network and the communication condition between the UE and the second network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method in a user equipment (UE) comprising:
provisioning a subscriber identity module (SIM) for a plurality of preferred telecommunication networks of a multi-network mobile edge computing (MEC) system, wherein each network of the plurality of preferred telecommunication networks are selected for inclusion in the MEC system by meeting an edge-computing requirement of an application loaded on the UE;

scanning for networks of the plurality of preferred telecommunication networks provisioned in the SIM to determine that one or more networks of the plurality of preferred telecommunication networks provisioned in the SIM are available, the one or more networks including a first network;

determining a priority level of each of the one or more networks based at least in part on a latency specified in a service level agreement associated with each of the one or more networks; and selecting the first network based at least in part on a priority level of the first network and a sensitivity of the application to changes in processing resulting from a handover;

running the application on the first network of the plurality of preferred telecommunication networks, the first network meeting the edge-computing requirement of the application loaded on the UE;

having a workload associated with the application distributed among edge-computing nodes of the first network; and upon detecting a degradation in a service associated with running the application on the first network, running the application on a second network of the plurality of preferred telecommunication networks, the second network meeting the edge-computing requirement of the application loaded on the UE.

2. The method of claim 1, wherein running the application on the second network of the plurality of preferred telecommunication networks includes:

dynamically switching from the first network to the second network based on a dual SIM dual standby (DSDS) mode or a dual SIM dual Active (DSDA) mode.

3. The method of claim 1, wherein having the workload of the application distributed among the edge-computing nodes of the first network includes:

causing the first network to distribute the workload of the application among the edge-computing nodes of the first network.

4. The method of claim 1, further comprising:

having the workload of the application distributed among edge-computing nodes of the second network.

5. The method of claim 4, wherein having the workload of the application distributed among the edge-computing nodes of the second network includes:

causing the second network to distribute the workload of the application among the edge-computing nodes of the second network.

6. The method of claim 1, wherein the first network of the plurality of preferred telecommunication networks meeting the edge-computing requirement of the application is based on a service level agreement (SLA) of the network associated with the UE.

7. The method of claim 6, prior to running the application on the first network, further comprising:

receiving an indication to activate the application; and wherein scanning for networks of the plurality of preferred telecommunication networks provisioned in the SIM is based at least in part on the indication.

8. The method of claim 6, wherein detecting the degradation in the service associated with running the application on the first network includes:

detecting a degradation associated with a first communication condition between the first network and the UE;

scanning for networks, other than the first network, of the plurality of preferred telecommunication networks provisioned in the SIM;

determining that one or more networks of the plurality of preferred telecommunication networks, other than the first network, are available based on a result of the scanning, the one or more networks including the second network;

determining a priority level of each of the one or more networks based on an SLA of a corresponding network with the UE;

determining a communication condition between the UE and each of the one or more networks; and selecting the second network based at least in part on the priority level of the second network and the communication condition between the UE and the second network.

9. The method of claim 8, further comprising:

determining a location of the UE, wherein scanning for the networks of the plurality of preferred telecommunication networks includes:

receiving a list of available networks of the plurality of preferred telecommunication networks based on the location; and scanning for the available networks of the plurality of preferred telecommunication networks.

10. The method of claim 1, wherein the service level agreement includes at least one of:

a specified amount of jitter.

11. The method of claim 1, wherein the priority level of the one or more networks is based at least in part on a ranking of the latency specified in the service level agreement of each of the one or more networks.

12. The method of claim 1, wherein the priority level of the one or more networks is based at least in part on a type of operations associated with the application running on the UE.

13. A system for a user equipment (UE) comprising:

one or more processors;

a subscriber identity module (SIM) communicatively coupled to the one or more processors; and memory communicatively coupled to the one or more processors, the memory storing computer-readable instructions that, when executed by the one or more processors, cause the one or more processors to perform operations comprising:

provisioning the SIM for a plurality of preferred telecommunication networks of a multi-network mobile edge computing (MEC) system, wherein each network of the plurality of preferred telecommunication networks are selected for inclusion in the MEC system by having an acceptable range of jitter and an acceptable range of latency according to an edge-computing requirement of an application loaded on the UE, running the application on a first network of the plurality of preferred telecommunication networks, the first network meeting the edge-computing requirement of the application loaded on the UE, having a workload associated with the application distributed among edge-computing nodes of the first network, upon detecting a degradation in a service associated with running the application on the first network, selecting a second network of the plurality of preferred telecommunication networks based at least in part on a sensitivity of the application to changes in processing resulting from a handover, running the application on the second network of the plurality of preferred telecommunication networks, the second network meeting the edge-computing requirement of the application loaded on the UE, and having the workload of the application distributed among edge-computing nodes of the second network.

14. The system of claim 13, wherein the SIM includes an eSIM or a dual SIM, and wherein running the application on the second network of the plurality of preferred telecommunication networks includes:

dynamically switching from the first network to the second network based on a dual SIM dual standby (DSDS) mode or a dual SIM dual Active (DSDA) mode.

15. The system of claim 13, wherein the network of the plurality of preferred telecommunication networks meeting the requirement of the application is based on a service level agreement (SLA) associated with the UE.

16. The system of claim 15, wherein the operations further comprise, prior to running the application on the first network:

receiving an indication to activate the application;

scanning, based at least in part on the indication, for networks of the plurality of preferred telecommunication networks provisioned in the SIM;

determining that one or more networks of the plurality of preferred telecommunication networks provisioned in the SIM are available based on a result of the scanning, the one or more networks including the first network;

determining a priority level of each of the one or more networks; and selecting the first network based at least in part on a priority level of the first network.

17. The system of claim 15, wherein detecting the degradation in the service associated with running the application on the first network includes:

detecting a degradation associated with a first communication condition between the first network and the UE;

scanning for another network of the plurality of preferred telecommunication networks;

determining that one or more networks of the plurality of preferred telecommunication networks are available based on a result of the scanning, the one or more networks including the second network;

determining a priority of each of the one or more networks based on an SLA of a corresponding network with the UE;

determining a communication condition between the UE and each of the one or more networks; and selecting the second network based at least in part on the priority of the second network and the communication condition between the UE and the second network.

18. One or more non-transitory computer-readable storage media storing computer-readable instructions that, when executed by one or more processors of a user equipment (UE), cause the one or more processors to perform operations comprising:

provisioning a subscriber identity module (SIM) of the UE for a plurality of preferred telecommunication networks of a multi-network mobile edge computing (MEC) system, each network of the plurality of preferred telecommunication networks selected for inclusion in the MEC system by meeting an edge-computing requirement of an application loaded on the UE;

running the application on a first network of the plurality of preferred telecommunication networks, the first network meeting the edge-computing requirement of the application loaded on the UE;

having a workload of the application distributed among edge-computing nodes of the first network according to a predetermined scheme;

upon detecting a degradation in a service associated with running the application on the first network, dynamically switching from the first network to a second network of the plurality of preferred telecommunication networks based on a dual SIM dual standby (DSDS) mode or a dual SIM dual Active (DSDA) mode and a sensitivity of the application to changes in processing resulting from a handover, the second network meeting the edge-computing requirement of the application loaded on the UE;

running the application on the second network; and having the workload associated with the application distributed among edge-computing nodes of the second network.

19. The one or more non-transitory computer-readable storage media of claim 18, wherein the operations further comprise, prior to running the application on the first network:

receiving an indication to activate the application;

scanning, based at least in part on the indication, for networks of the plurality of preferred telecommunication networks provisioned in the SIM;

determining that one or more networks of the plurality of preferred telecommunication networks provisioned in the SIM are available based on a result of the scanning, the one or more networks including the first network;

determining a priority level of each of the one or more networks; and selecting the first network based at least in part on a priority level of the first network.

20. The one or more non-transitory computer-readable storage media of claim 18:

wherein the network of the plurality of preferred telecommunication networks meeting the requirement of the application is based on a service level agreement (SLA) associated with the UE, and wherein detecting the degradation in the service associated with running the application on the first network includes:

detecting a degradation associated with a first communication condition between the first network and the UE;

scanning for another network of the plurality of preferred telecommunication networks;

determining that one or more networks of the plurality of preferred telecommunication networks are available based on a result of the scanning, the one or more networks including the second network;

determining a priority of each of the one or more networks based on an SLA of a corresponding network with the UE;

determining a communication condition between the UE and each of the one or more networks; and selecting the second network based at least in part on the priority of the second network and the communication condition between the UE and the second network.

* * * * *